(12) United States Patent
Repp et al.

(10) Patent No.: US 6,838,398 B2
(45) Date of Patent: Jan. 4, 2005

(54) QUILTING METHOD AND SYSTEM

(75) Inventors: Jilene A. Repp, Hartland, WI (US); Francis A. Yogerst, West Bend, WI (US)

(73) Assignee: June Tailor, Inc., Richfield, WI (US)

( * ) Notice: Subject to any disclaimer, the term of this patent is extended or adjusted under 35 U.S.C. 154(b) by 0 days.

(21) Appl. No.: 09/900,927

(22) Filed: Jul. 9, 2001

(65) Prior Publication Data

US 2003/0008579 A1 Jan. 9, 2003

(51) Int. Cl.[7] .................... B32B 27/04; B32B 27/12; B32B 3/00; B32B 23/14; D04H 13/00
(52) U.S. Cl. .................... 442/59; 442/149; 442/150; 442/343; 442/346; 442/347; 442/102; 428/196; 428/197; 428/198; 428/199
(58) Field of Search .................... 442/149, 150, 442/343, 346, 347, 102; 428/196–102

(56) References Cited

U.S. PATENT DOCUMENTS

| | | |
|---|---|---|
| 1,856,556 A | 5/1932 | Hemmerich |
| 4,333,982 A | 6/1982 | Rand |
| 4,613,538 A | 9/1986 | Wendell et al. |
| 5,512,346 A | 4/1996 | Johnson .................... 428/74 |
| 5,546,877 A | 8/1996 | Moore |
| 5,832,696 A | 11/1998 | Nagy et al. .................... 53/430 |
| 6,034,014 A | 3/2000 | Rapp et al. .................... 501/35 |
| 6,051,090 A | 4/2000 | Healy et al. |
| 6,326,450 B1 | 12/2001 | Shipston et al. .......... 526/318.4 |
| 6,387,831 B2 | 5/2002 | Rhim et al. .................. 442/414 |
| 6,419,865 B1 | 7/2002 | Gryskiewicz et al. ....... 264/122 |
| 6,562,257 B1 | 5/2003 | Chen et al. ............ 252/183.13 |

OTHER PUBLICATIONS

"Bear Tracks", American Patchwork & Quilting Magazine.
"Threaded Ribbons" and "Hole In The Barn Door", Quilt Magazine, pp. 68–70.
"Nine Patch"and "Cactus Basket", Quilt Magazine, pp. 76–78.
Michele Crawford, Thanksgiving Table Topper Set, Quilt World, pp. 23–25 and 44, bearing a designation of "Nov. 1997".
Sunnie's Pig, Quilt World, pp. 41–42, bearing a designation of "Mar. 1998".
Michele Crawford, Easter Basket Banner, Quilt World, pp. 15–18, bearing a designation of "Mar. 1998".
"Etui" An Heirloom Needlebox, Hancock Fabrics, Minnesota Fabrics, Hancock Fabric Warehouse, the Fabric Market.
Pick A Place Mat, 6 Place Mats With Pockets For Coordinating Napkins, Arts Craft Leaflets.

Primary Examiner—Terrel Morris
Assistant Examiner—Lynda Salvatore
(74) Attorney, Agent, or Firm—Foley & Lardner

(57) ABSTRACT

A method of making a quilt includes a batting including a heat activated adhesive coating each side or faces of the batting. The quilt covers are attached to the batting by sequentially placing the covers onto the respective batting faces and heating each cover and adjacent adhesive by moving a hot iron over each cover. The covers are connected to each by a plurality of spaced yarn or other suitable decorative connecting means which extend through the covers and batting to secure the batting in place and may form a desired decorative pattern. The inactive adhesive remains in the quilt or is removed by washing of the quilt. The batting with the inactive adhesive is provided as a commercially available product.

49 Claims, 1 Drawing Sheet

QUILTING METHOD AND SYSTEM

The present Application is a divisional of U.S. application Ser. No. 09/521,810 titled "Quilting Method and System" filed on Mar. 9, 2000, now U.S. Pat. No. 6,261,397.

The present Application claims the benefit of priority as available under 35 U.S.C. §§ 120 and 121 of U.S. application Ser. No. 09/521,810 titled "Quilting Method and System" filed on Mar. 9, 2000, now U.S. Pat. No. 6,261,397.

BACKGROUND OF THE INVENTION

The present invention relates to a quilting method and system and particularly to a method and system for assembling of the top and bottom quilt covers to the opposite faces of a batting.

A quilt generally consists of a top cover and a bottom cover with an interposed soft batting. The upper or top cover may be formed by sewing small pieces to each other to form a decorative cover. The top and bottom covers are further interconnected in multiple spaced locations by various elements which pass through the batting to hold the batting in place and further contributes to the decorative effect.

In the prior art methods and systems, the covers are first manually secured to each other and the batting by safety pins, tacking usually with a special gun, a basting with needle, or application of a spray set active liquid glue to temporarily hold the cover in place during the forming of a final decorative cover, including a finished connection of the cover and batting. The temporary connections are then manually removed to finish the quilt. The attachment and removal are both tedious and time consuming.

Although widely used, an alternative simpler method and system has not been suggested in the prior art.

The present invention includes a novel and less tedious method and system for use in the craft of quilting.

SUMMARY OF THE INVENTION

Generally in accordance with the present invention, the covers are attached to the batting by an inactive adhesive which is activated after assembly of the batting and covers to secure the batting in the necessary position between the covers without the necessity for sewing or other known prior art means which generally require a manual time consuming task for creating and subsequent removal of the temporary attaching means. The inactive adhesive by proper selection may remain part of quilt or removed by washing or the like.

In a preferred method and system, the opposite surfaces of the batting are covered with a thin film of the inactive adhesive and preferably a heat activated inactive adhesive. The inactive adhesive is applied to the batting and the batting sold with the adhesive thereon. Instructions for assembling the covers and activating the inactive adhesive, as by passing a hot iron over the cover are given to secure the cover to the batting. The quilt may then be completed by the known methods of connecting the covers and batting to produce the desired decorative covers.

In summary, an inactive adhesive is interposed between a quilt cover and the adjacent batting to at least temporarily attach the cover to the batting. The bonded quilt covers and batting are then fixedly attached to each other by the usual quilting method and systems to form a decorative cover. The inactive adhesive bonding is preferably applied to attach both covers to the batting for at least the temporary securing of the covers for the subsequent known type of final securing the quilt covers to the inner batting without the prior art necessity of removing temporary connection means.

The inactive adhesive is preferably a heat activated material which is readily activated by the heat of a typical well-known hot ironing unit used for pressing clothing. Other energy or other activated adhesives may be used within the scope of the invention but the heat activated adhesive using a typical hot iron will be readily understood by a typical quilter.

The system reduces the time to complete the quilt and particularly eliminates the time consuming and tedious steps of manually connecting the temporary attachment of the cover and the subsequent removal thereof.

BRIEF DESCRIPTION OF THE DRAWINGS

The drawings illustrate a preferred embodiment of the invention.

In the drawings.

DESCRIPTION OF THE ILLUSTRATED EMBODIMENT

Figure 1:
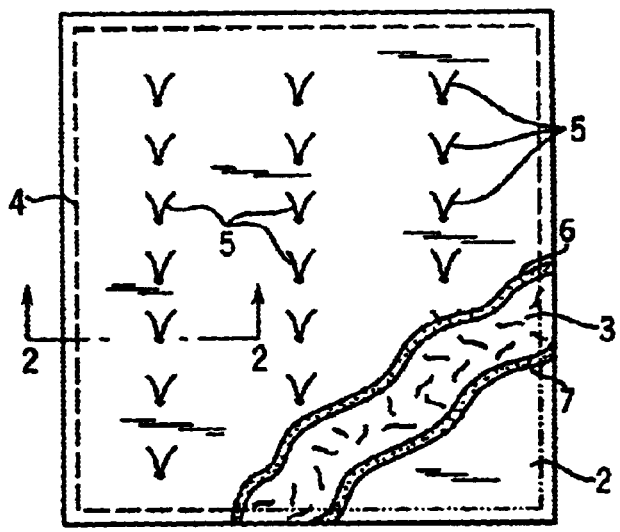
FIG. 1 is a plan view of a quilt constructed in accordance with the present invention, with parts broken away to show detail of the construction.
Figure 2:
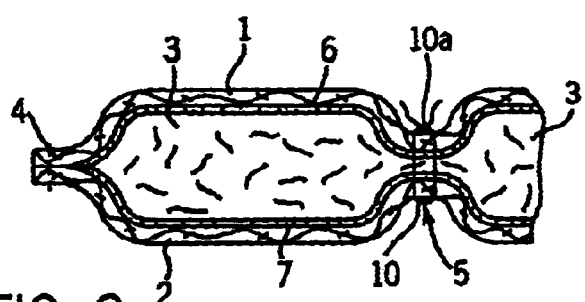
FIG. 2 is a partial cross-section taken generally on line 2—2 of FIG. 1.
Figure 4:
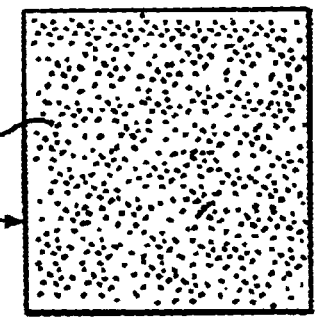
FIG. 4 is a plan view of a batting forming a part of the quilt of FIGS. 1–3.

Referring to the drawings and particularly FIGS. 1 and 2, a quilt is shown including top and bottom covers 1 and 2 separated by a central batting 3. The batting 3 is formed of relatively thick and soft material which is substantially thicker than the cloth covers 1 and 2. The outer edges of the quilt 1 are joined by a sewn connection 4 to enclose the batting 3. In addition, the covers and batting are joined by any of the various prior art methods to form a decorative quilt cover and is shown for purposes of illustration including a plurality of spaced connectors 5. Each connector 5 is a thread of yarn or other material, which secures the covers 1, 2 and the batting 3 together to hold the batting 3 in place and to form a decorative cover.

FIGS. 1 and 2, as described above, generally illustrate a typical prior art quilt which is hand prepared by individuals in the quilting art. The covers 1 and 2 are formed of a suitable cloth and the batting 3 of the thicker and soft material. The one cover may be formed of small individual pieces, not shown, which are separately sewn together to form a highly decorative cover. In a typical prior quilting method, the covers and batting are temporarily joined by stitching, or other prior art means as discussed above, throughout the assembly to temporarily hold the covers and batting in place during the completing of connectors 5, after which the temporary attachment means is manually removed.

In accordance with the present invention, the quilt of FIGS. 1 and 2 include adhesive connections 6 and 7 at the interfaces of covers 1 and 2 to the batting 3. As more fully developed hereinafter, adhesives 6 and 7 are applied throughout the interfaces in an inactive state and the adhesive is selected such as to remain part of the quilt or may be removed by hand or machine washing of the quilt or other suitable means.

Figure 3:
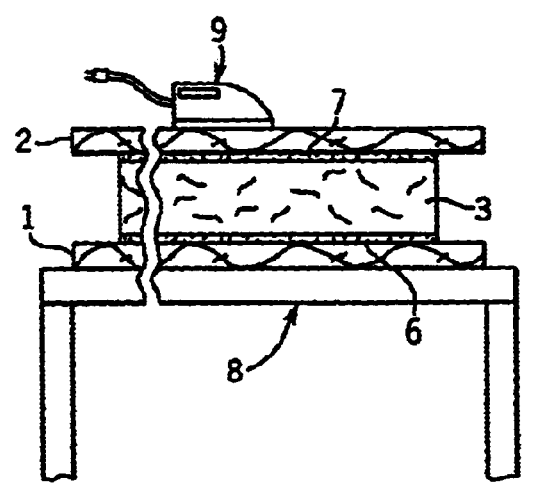
FIG. 3 is an enlarge partial view of the quilt in the process of forming the quilt of FIG. 1.

More particularly, the batting 3 is preferably a preformed member with outer inactive adhesive coatings 6 and 7 applied to the faces of the batting, as more clearly shown in FIG. 3, which illustrates the members 1–3 assembled with the coatings 6 and 7 on the batting 3. The adhesive coatings 6 and 7 are relatively thin coatings and each is shown substantially enlarged for purposes of illustration. The coatings are such as to maintain a soft, flexible quilt if they are to remain a part of the final quilt. The inactive adhesive coating is activated after assembly with covers to form an active adhesive which joins the covers 1 and 2. A preferred adhesive is heat activated to convert the inactive adhesive to a bonding state.

In the process of forming the quilt, the covers 1 and 2 and the batting 3 are cut to the desired shape. The batting 3 has the inactive adhesives 6 and 7 on the opposite sides or faces. As shown in FIG. 3, the batting assembly of FIG. 3 is placed on a support 8, such as a table, with the adhesive 7 on the exposed top face. The cover 2 is placed, in proper alignment, on the batting 3. The coating is activated by heating. In a preferred method, a conventional hot electric iron unit 9 is applied over the entire surface of the cover 2. The heat of the iron activates the inactive adhesive 7 and fixes the cloth cover 2 to the batting 3. The batting 3 with the attached cover 2 is reversed upon table 8 and the cover 1 is aligned with the batting 3. The hot iron unit 9 is again moved over the cover 1, activating the inactive adhesive 6 on the abutting face of the batting to join the cover 6 to the batting 3.

The covers 1 and 2 are thereby sequentially fixed, at least temporarily, to the batting 3, and the assembly is ready to receive the connectors 5, which are attached in a conventional manner. Each illustrated connector 5 is generally a U-shaped thread 10 passing through the assembly and secured by a knot 10a to the quilt, as shown in FIG. 2, in accordance with one of the many prior art methods for forming a decorative covered quilt.

After all or a significant forming of the decorative cover, the partially finished quilt is completed by securing the edges as by the sewn connection 4.

The adhesive used is preferably a thin layer which maintains the complete flexibility and softness of the quilt, and is preferably a material which may be removed by washing or otherwise treating of the quilt.

More particularly, the adhesive 6–7 in the preferred construction is an adhesive such as sold under the trademark "Sol-U-Web" and manufactured and sold by Freudenburg Nonwoven Group of 20 Industrial Avenue, Chelmsford, Mass. 01824. The adhesive is a water soluble nonwoven adhesive material having an interlaced construction for bonding fabrics. The adhesive as applied to the batting 3 was a less concentrated version of the product as sold to the general public. The inactive adhesive is readily heat activated and may remain a part of the final quilt, or readily removed by hand or machine washing the quilt. Those skilled in the art can provide other adhesives suitable for use in the present invention based on the teaching of the invention.

In the current construction of the batting, the adhesive is sprayed over the opposite faces of batting and forms a thin coating to mass produce batting with in-place inactive adhesive. The batting is thus readily available in desirable sizes in a state for assembly to the covers by the quilting trade.

The above adhesive, or any other suitable inactive adhesive, could be supplied in the quilting market for appropriate application by the individual quilters. The factory mass produced product provides accurate control of the applied adhesive and the benefits of mass production as well as quality control to produce an optimal system securing the covers to the batting.

The batting 3 may be of any suitable material such as presently used in quilting or others having the necessary softness, and which is compatible with the adhesive. Acceptable present day batting is of various types and generally includes 100% cotton, cotton and polyester blends and 100% polyester. Presently used batting has included 100% cotton and 100% polyester as well as 80% cotton/20% polyester, with various types of the 100% polyester batting identified as high loft, a low loft or a needle punch/traditional type. The above disclosed product as presently produced are typical construction and are not limited with respect to the scope of the present invention.

The present invention has been found to produce a high quality quilt which is equal to or better than that produced with the time consuming and tedious prior art stitching or other means.

The preferred embodiment of the invention has been described using a heat activated adhesive which is applied to the batting and which is then sold with proper instructions for use. Any other activatable adhesive may be used to form the adhesive covered batting sold as a unit for application by the quilter. The preferred embodiment has both surfaces of the batting fully covered. Further, the system may have the inactive adhesive applied by the quilter by a suitable spray unit or other applicators which can establish the desired inactive adhesive coating. Although not considered as a particularly practical system, a thin adhesive film may be applied to the cloth cover. However, this would normally require care in the application and would not provide the final advantages of the preferred systems disclosed in the preferred embodiment and the other possible variations discussed above. The inactive adhesive may also be applied in various patterns which do not form a complete and continuous adhesive over the batting face, but which properly secure the covers and batting to permit application of the desired decorative cover. In summary, the preferred embodiment provides a most effective and useful inactive adhesive cover attachment for producing the necessary final decorative connection of the covers to the batting in the quilting art. However, variations of the method of producing and applying an effective inactive adhesive type for subsequent assembly during the quilting steps of attaching the covers to the batting may be found by those skilled in the art based on the teaching herein and are within the scope and teaching of the present invention and accompanying claims.

We claim:

1. In a batting of a type having opposing faces and a softness and a flexibility and configured for use in the formation of a quilt, the quilt having at least one cover to be securably attached to the batting by spaced apart connectors, the improvement comprising:
   a composite member formed of the batting and an adhesive material applied to the batting;
   wherein the batting consists of cotton or polyester or cotton-polyester; and
   wherein the adhesive material at least temporarily secures the cover to the batting;
   so that the at least one cover can be attached to the batting during formation of the quilt by the adhesive at the opposing faces, wherein the adhesive is removable from the quilt after formation of the quilt.

2. The batting of claim 1 wherein the adhesive material comprises a non-woven material.

3. The batting of claim 1 wherein the adhesive material will remain in the quilt after the cover is attached to the batting by spaced apart connectors.

4. The batting of claim 1 wherein the adhesive is activated to securely bond the cover to the batting.

5. The batting of claim 1 wherein the adhesive, provides a connection formed by application of heat and pressure.

6. The batting of claim 4 wherein the adhesive is configured to be heat activated by an iron.

7. The batting of claim 1 wherein the adhesive material comprises a water-soluble material.

8. The batting of claim 1 wherein the adhesive material is applied to substantially all of an interface for attachment of the cover.

9. The batting of claim 2 wherein the adhesive material is applied to a portion of the batting.

10. The batting of claim 4 wherein the adhesive material is applied to at least one of the opposing faces of the batting as a pattern.

11. The batting of claim 1 wherein the adhesive material is applied by spraying to at least one of the opposing faces of the batting as a pattern.

12. The batting of claim 5 wherein the adhesive connection is removable by hand.

13. The batting of claim 1 wherein the batting is a thick material relative to a fabric cover of the quilt.

14. In a batting of a type having opposing faces and a softness and a flexibility and configured for use in the formation of a quilt, the quilt having at least one cover to be securably attached to the batting by spaced apart connectors, the improvement comprising:
   a composite member formed of the batting an an adhesive material configured for bonding fabrics applied thereto;
   wherein the batting consists of cotton or polyester or cotton-polyester; and
   wherein the adhesive material comprises an adhesive configured to form a bond at the opposing faces of the batting;
   so that a cover can be at least temporarily secured to the batting with the bond formed by the adhesive material before the cover is attached to the batting with connectors and the bond can be removed after the cover is attached to the batting with connectors to form a soft and flexible quilt.

15. The batting of claim 14 wherein the adhesive material is activated by application of heat.

16. The batting of claim 15 wherein the application of heat is by pressing.

17. The batting of claim 14 wherein the adhesive material is removable by a treatment.

18. The batting of claim 14 wherein the adhesive material temporarily attaches the cover to the batting.

19. The batting of claim 14 wherein the adhesive material is provided in a thin coating to maintain the complete flexibility and softness of the quilt formed by attachment of a cover to each of the opposing faces of the batting.

20. The batting of claim 14 wherein the adhesive material comprises a nonwoven material.

21. The batting of claim 14 wherein the adhesive material is applied to the opposing faces of the batting.

22. The batting of claim 14 wherein the adhesive material is applied to at least a portion of the opposing faces of the batting in a pattern.

23. The batting of claim 14 wherein the composite member provides an interface for attachment of the cover to the batting and the adhesive material is provided throughout the interface.

24. The batting of claim 14 wherein the adhesive material is applied to a portion of the batting.

25. The batting of claim 14 wherein the adhesive material is applied to the batting by spraying at least one of the opposing faces.

26. The batting of claim 14 wherein the adhesive material comprises a water-soluble material.

27. The batting of claim 14 wherein the adhesive material is inactive until activated by application of heat and pressure.

28. The batting of claim 14 wherein the adhesive material is applied to at least one of the opposing faces of the batting as a thin layer.

29. The batting of claim 14 wherein the bond is removable by hand.

30. The batting of claim 14 wherein the adhesive material applied to the batting is interfaced.

31. The batting of claim 14 wherein the adhesive material will remain in the quilt formed after attachment of covers to each of the opposing faces of the batting by spaced-apart connectors.

32. The batting of claim 14 wherein the composite member consists of cotton and polyester with the adhesive.

33. In a batting of a type having opposing faces and a softness and a flexibility and configured for use in the formation of a quilt, the quilt having at least one cover to be securably attached to the batting by spaced apart connectors, the improvement comprising:
   a composite member formed ofthe batting and an adhesive material for bonding of fabrics applied to the batting;
   wherein the batting cosists of contton or polyester or cotton polyester; and
   wherein the adhesive material for bonding of fabrics comprises a water-soluble material and is configured to form a bond to at least temporarily secure the cover to the batting;
   so that the at least one cover can be attached to the batting by an adhesive connection formed by the bond at the opposing faces of the batting during formation of the quilt.

34. The batting of claim 33 consisting of cotton or polyester or cotton-polyester that is needle punched.

35. The batting of claim 33 wherein the adhesive material will remain in the quilt after the cover is attached to the batting by spaced apart connectors.

36. The batting of claim 33 wherein the adhesive material is activatable.

37. The batting of claim 33 wherein the cover is at least temporarily secured to the batting with the adhesive material by pressing the cover to the batting.

38. The batting of claim 33 wherein the cover is at least temporarily secured to the batting with the adhesive material by application of heat.

39. The batting of claim 33 wherein the adhesive material is applied as a coating to the batting.

40. The batting of claim 33 wherein the adhesive material does not securely bond the cover to the batting until activated.

41. The batting of claim 33 wherein the water-soluble material comprises a water-soluble adhesive.

42. The batting of claim 33 wherein the adhesive material provides an interface between the cover and the batting.

43. The batting of claim 33 wherein the adhesive material is provided to a portion of the batting.

44. The batting of claim 33 wherein the adhesive material is applied by spraying to at least one of the opposing faces of the batting.

45. The batting of claim 33 wherein the batting is thick relative to a fabric cover for the quilt.

46. The batting of claim 33 wherein the adhesive material comprises a non-woven material.

47. The batting of claim 33 wherein the adhesive material is applied to the batting in a pattern.

48. The batting of claim 33 wherein the adhesive material is removable by washing.

49. The batting of claim 1 consisting of cotton or polyester or cotton-polyester that is needle punched.

* * * * *

UNITED STATES PATENT AND TRADEMARK OFFICE
CERTIFICATE OF CORRECTION

PATENT NO. : 6,838,398 B2
DATED : January 4, 2005
INVENTOR(S) : Jilene A. Repp and Francis A. Yogerst It is certified that error appears in the above-identified patent and that said Letters Patent is hereby corrected as shown below:

<u>Column 4,</u>
Line 61, after "of the quilt by" delete "the" and insert -- an --.

<u>Column 5,</u>
Line 29, after "formed of the batting" delete "an" and insert -- and --.

<u>Column 6,</u>
Line 24, after "a composite member formed" delete "ofthe" and insert -- of the --.
Line 27, after "wherein the batting" delete "cosists of contton" and insert -- consists of cotton --.

Signed and Sealed this

Tenth Day of May, 2005

JON W. DUDAS
*Director of the United States Patent and Trademark Office*